March 22, 1927.

E. WECKER 1,622,126

PROCESS FOR SEPARATING VOLATILE SUBSTANCES

Filed March 13, 1924     2 Sheets-Sheet 1

Inventor:
Ernst Wecker.

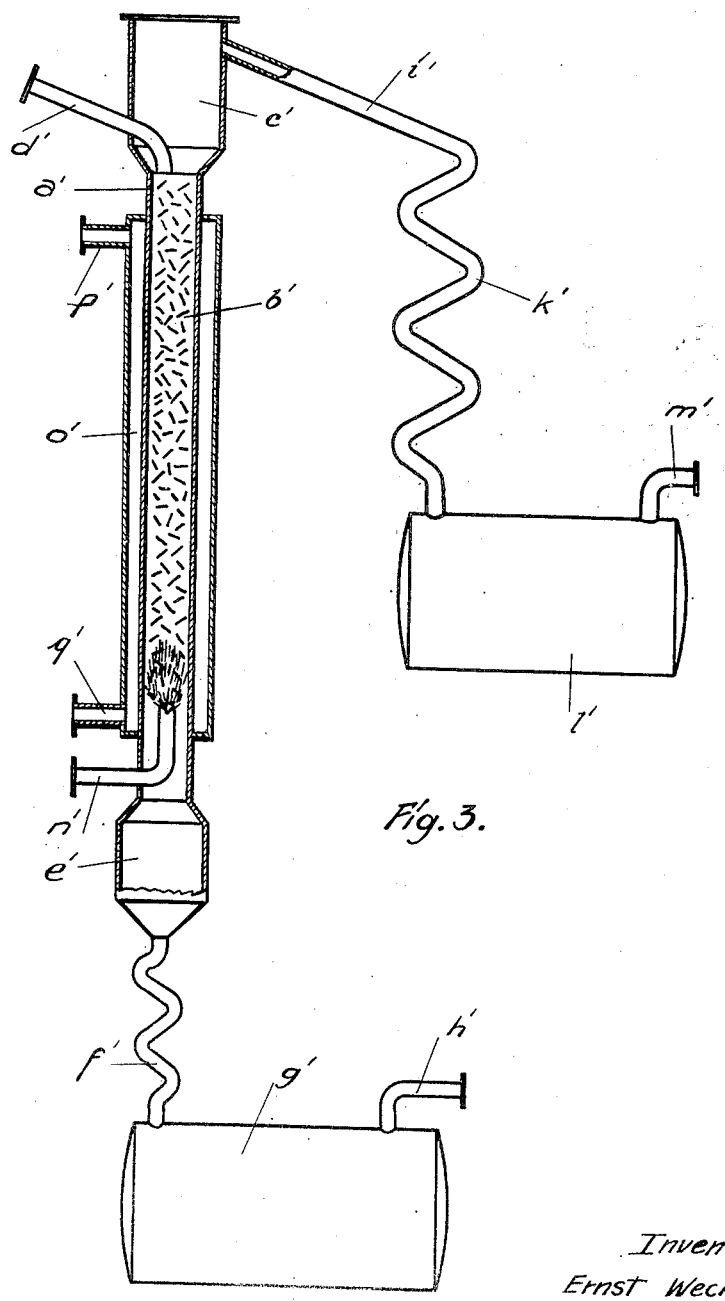

Patented Mar. 22, 1927.

1,622,126

UNITED STATES PATENT OFFICE.

ERNST WECKER, OF HEILBRONN, GERMANY.

PROCESS FOR SEPARATING VOLATILE SUBSTANCES.

Application filed March 13, 1924, Serial No. 699,137, and in Germany March 20, 1923.

The present invention is directed to a process for separating volatile substances from less volatile substances. This invention is more particularly directed to a process for separating fatty acids from soaps and from soap-stock and also from oils such as whale oils, edible oils and fats. This process is also directed to the separation of resin oils from resins and also for the separation of volatile substances from lignite and coal gas tars and from petroleum and like materials.

It has been previously suggested to treat neutral fats at a high temperature with indifferent and permanent gases for the purpose of removing fatty acids present in the fats. Hydrogen has been most used for this purpose. These gases have been passed through the fats at such a rate and at such a temperature that the fatty acids are removed without the use of a vacuum. It has been proposed to pass superheated steam through dehydrated fatty substances under reduced pressure for the same purpose. By using a vacuum, the distillation temperature of the fatty acids was claimed to be lowered to about 90 to 150° C. The indifferent gases, such as hydrogen and steam above mentioned, which are employed in the process just described are those which do not have a detrimental effect on the material treated. Ordinary steam at 100° C. may be employed in the place of superheated steam, if the fat to be treated is heated to sufficiently high temperature.

An important disadvantage of the process just described arises from the fact that the length of time necessary to complete the removal of the fatty acids is very large. Another disadvantage arises from the fact that in order to remove the last traces of fatty acids a considerable loss of neutral fat results. Decomposition and polymerization also occurs with the consequent darkening of the color of the fat and a deterioration of its quality. The above disadvantages are avoided by the process described and claimed in this specification. Fatty acids are substantially completely removed from oils containing the same without injurious effects on the fat. The process comprises the introduction of liquids such as water, benzol, toluol, and alcohol, in the form of a fine mist into the heated fat or oil. This introduction may be effected by blowing the liquids into the heated oil. This may be done, for instance, by using a neutral gas for blowing these liquids into the heated oil. Among the neutral gases which may be employed are carbon dioxide, nitrogen, mixtures thereof, superheated steam or dry saturated steam. These gases act as transporting or carrying agents for the above mentioned liquids. The oil is heated in the neighborhood of 250 to 280° C., or if the fatty acids are easily volatilized the oil or fat may be heated to a lower temperature, for instance, about 220 to 250° C. It has been found that the process is materially aided if the oil is maintained at those temperatures under reduced pressure and the mist of the liquids above mentioned are blown into this heated oil under such reduced pressure.

The small liquid particles which are injected in the form of this fine mist on entering into the heated oil expand violently and instantaneously and are thus explosively vaporized. The heated oil acts as a vaporizer and also as a superheater. This instantaneous vaporization is aided by the vacuum imposed upon the oil. As a result of this violent and explosive evaporation of the injected liquid, within the body of the oil, an instantaneous expulsion and distillation of the fatty acids in the oil is effected. The latter goes over as a thick fog. The temperature of this fog is lower than the temperature of the heated oil. If the temperatures are those mentioned previously, the temperature of this fog may be in the neighborhood of 120 to 150° C. The action above described is improved and accelerated by using as high a vacuum as possible, for instance, 30 to 40 m. m. mercury pressure.

In addition to the removal of the fatty acids, ill-smelling constituents of the fats are also removed by this distillation. As a result, a complete deodorization of the oil or fats is obtained. For instance, in treating cocoanut oil all of the evil smelling ketones are also removed with the fatty acids. It is therefore not necessary to specially treat the oil to deodorize the same. This process is also applicable to the deodorization of oils and fats which have been previously freed of fatty acid by well known methods, for instance, by treatment with alkali.

The oils and fats treated by the process of this invention show no deleterious effects. The color is not spoiled. They do not show any symptoms of polymerization. There is no decomposition; no trace of acroleine being noticeable. The present process in contradistinction to the processes heretofore available, is capable of treating oils with a larger variation of fatty acid content. Thus oils varying from about 5% to 50% or more of free fatty acids may be treated with a substantially complete removal of fatty acid and the complete deodorization. The acid content of the oil treated by this process is from 0.3% to 0.1%, that is a substantially quantitative deacidification has been effected. This deacidification by the injection of liquids, such as water, is surprising in view of the fact that the heating of neutral fats and water for the purpose of hydrolyzing the oils is well known. The effect of finely distributed water preferably in conjunction with the application of vacuum on highly treated oils is therefore surprising.

As was said previously, the liquids which are to be injected may be carried by gases which have no detrimental effects on the substances to be treated. Such gases, as was previously stated, may be carbon dioxide or nitrogen, mixtures thereof, such as flue gases from which the oxygen has been removed, and hydrogen. Superheated steam may be employed as a carrier for the atomized liquids. When using water as the injected liquid saturated or even superheated steam may be employed. This steam is charged with moisture to convert it into a wet steam. Wet steam directly produced may also be employed for this purpose. The temperature of the steam should be preferably at 100 to 180° C. and under a corresponding pressure.

The following examples are given as illustrative of this invention.

1.—Two kilograms of Arachis oil containing about 13% of fatty acids are heated to 280° C. in an autoclave or in a series of autoclaves. A vacuum corresponding to 30 m. m. mercury column is maintained upon the autoclave. A heated current of carbon dioxide carrying a mist of water suspended therein is injected into the heated oil by means of a suitably constructed nozzle. If a series of autoclaves is employed a separate nozzle is provided for each container. The fatty acid vapors which escape as the thick fog are caught in a condenser. After treating for five to eight minutes the oil contains only 0.2% free fatty acids.

2.—Cocoanut oil containing 1% of free fatty acids is heated according to the method described under Example 1 to about 250° C. Water at a temperature of 100° C. is sprayed into superheated steam at a temperature of 150° C. and at a pressure of 2½ atm. The mixture is immediately injected into the heated oil. The deacidification of the oil is complete after about three minutes treatment. The oil, after treatment, contains about 0.1% free fatty acids.

3.—Sesame oil containing about 5% free fatty acid is treated by the method of Example 1. The oil is heated to about 270° C. Wet steam at about 130° C. is injected into the oil for about 8 to 10 minutes. The wet steam which is injected may be wet steam directly formed or formed by mixing ordinary dry live steam with water. After this treatment of the oil it contains about 0.3% fatty acids.

In carrying out the processes above described, it is advantageous to employ series connected vessels. The oil or fats are introduced into the vessel at one end of the series and caused to flow at a regulated rate through the vessels. This rate is so regulated that the oil on exiting from the series will have been treated for the desired time. The reaction vessels are advantageously provided with distributing devices to insure a thorough mixing of the injected liquid spray and the substance to be treated. This can be obtained by employing baffles or filling bodies such as Raschig-rings and also by subdividing the reaction vessels into intercommunicating chambers. Instead of using several reaction vessels connected in series, towers filled with distributing members such as the above mentioned rings may be employed. The oil and liquid mist may be passed countercurrent through these towers.

The accompanying drawings illustrate by way of example various constructional forms of apparatus, which can be used for the new process.

Fig. 3 shows an apparatus with a reaction vessel in tower form, in which the substances to be treated and the atomized liquid are led in countercurrent to one another.

Figure 1:
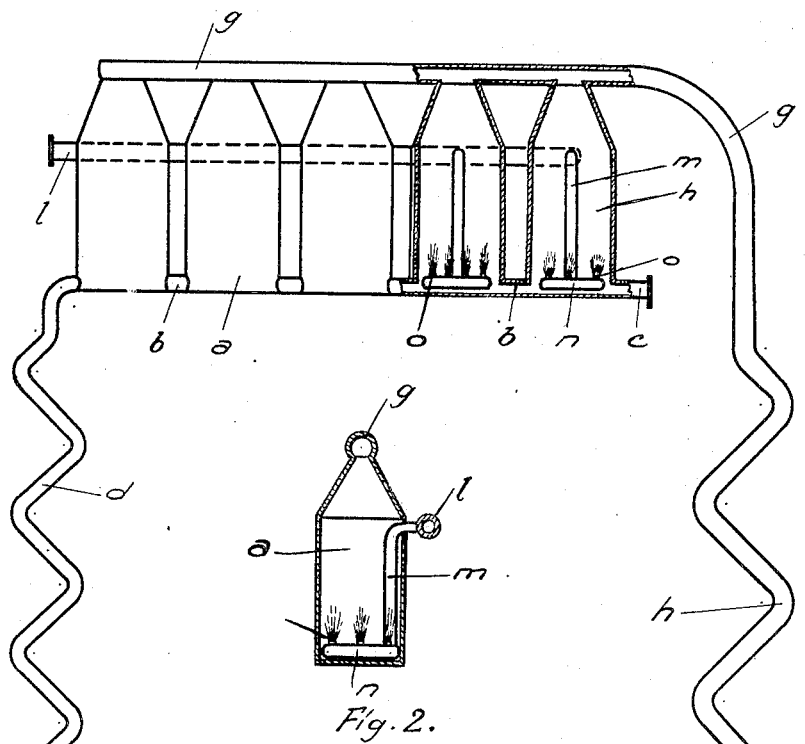
Fig. 1 shows an apparatus with a plurality of reaction vessels connected in series, the first three vessels from the left being shown in elevation, the two last in longitudinal section.

In Fig. 1 the various reaction vessels have been indicated by *a*; they are connected with one another by conduits *b*. The oil or fat is preferably admitted near the bottom of the vessels by means of the conduit *c*, while the purified substances leaving the last vessel, which are preferably cooled when flowing off through the conduit *d*, collect in the container *e*. The container *e* is preferably connected to a vacuum by means of the conduit *f*.

The expelled volatile substances, for example the fatty acids are removed through the conduit *g* and after they have preferably passed through a cooler *h* they pass into the collector $i$ which is also connected to a high vacuum for instance by means of the conduit $k$.

The finely distributed liquids, for instance the mixture of gas and atomized liquid are admitted through the intermediary of the conduit $l$, from which branch conduits $m$ lead into the lower part of each vessel $a$. At the lower end of the conduit $m$ are provided one or more annular connections, which are provided with nozzles or fine openings $o$ for the outlet of the atomized liquid.

Figure 2:
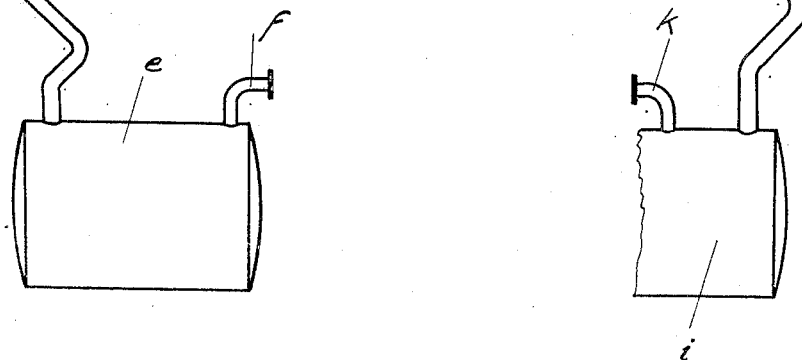
Fig. 2 shows on a larger scale a cross section through a reaction vessel and the conduits connected thereto.

Fig. 2 shows on a somewhat larger scale a section of a vessel $a$ with the outlet pipe $g$ connected to the upper part of the vessel, for the fatty acids, as well as with the admission conduit for the liquid vapor 1 and the branch conduits $m$ and $n$ with the nozzles $o$.

The apparatus shown in Fig. 3 consists of the tower-like reaction vessel $a'$, preferably arranged vertically or slightly inclined and provided with distributing members or filling members for instance Raschig rings.

The raw material, for instance the fat or oil enters through the conduit $d'$ leading into the upper part of the reaction tower $a'$, preferably in an extension $c'$ of the same. During the treatment, the oil or fat flows through the reaction vessel $a'$ in a downward direction and at the lower end of the vessel passes into an extended collecting space $e'$ from which it flows through the cooler $f'$ to the collector $g'$. The latter is connected with the vacuum for instance through the conduit $h'$.

The volatile substances escaping during the reaction, for instance the fatty acids, are led through the conduit $i'$ to the cooler $k'$ and thereupon pass into the collector $l'$. The latter is connected with a high vacuum by means of the conduit $m'$.

The finely distributed liquids or mixtures of gas and atomized liquid are admitted in the lower part of the reaction tower $a'$ by means of the conduit $n'$. The atomized liquids entering through these conduits move upwards in countercurrent to the substances flowing downwards.

The reaction vessel $a'$ can be heated for instance by means of a heating jacket $o'$, for instance by a connection with a hot air pipe or steam pipe by means of the conduits $p'$ and $q'$.

Another important advantage of this process resides in the fact that certain constituents which are not removed by distillation are precipitated. For example, the color of edible oils, such as sesame oil, or Arachis oil, is greatly improved and becomes much lighter. As a result of the treatment above described the color matter which is present in colloidal solution, for example, chlorophyll, phlobaphene is broken up and precipitated. The precipitation of these colloids is accelerated and increased by the presence of substances which will coagulate at the temperatures employed. For instance, albuminoids which are always present in the crude oils are coagulated by the temperature employed and cause a precipitation of the colloids. Most likely the coagulated albuminoid, on flocculating, occludes the coloring matter and therefore clears up the oil by the removal of these colloids.

The present process finds an important application in the manufacture of soap, oleine and stearine. It is usual in this industry to hydrolyze the fats to form glycerine and fatty acids. The glycerine is then separated by washing, leaving a mixture of about 85% fatty acids and about 15% unhydrolyzed neutral fats. This mixture is then subjected to ordinary distillation to remove the fatty acids from the neutral fats. During this distillation a part of the fatty acids and especially neutral fat undergoes pyrogenous decomposition. In consequence, so-called stearine pitch, acroleine and other by-products and residues are obtained.

The above disadvantages may be avoided by employing the process of this invention for the separation of the fatty acids from the neutral fats. The hydrolysis may be carried out to a smaller degree than is usual, for instance, to obtain about 70% free fatty acids. The mixture of free fatty acids and neutral fats obtained after the removal of the glycerine may be treated by the process above described. The residual neutral fats after removal of free fatty acids may be returned for further hydrolysis.

In the following claims by the term "oils" I mean to include oily substances, commonly known as oils and fats.

The above description is to be taken not as limiting my invention, but merely illustrative of the invention, which I claim to be:

1. A process of refining oil containing fatty acids which comprises heating said oils to an elevated temperature, injecting into said oils a liquid in the form of a fine mist, said liquid being highly volatile at the temperature to which the oil has been heated, thereby producing an instantaneous expansion and volatilization of the injected liquid and vaporizing the fatty acids in the oil and withdrawing said vapor.

2. The process of refining oil containing fatty acids which comprises heating said oils to an elevated temperature, injecting into said oils a liquid in the form of a fine mist suspended in a neutral carrier gas, said liquid being highly volatile at the temperature to which the oil has been heated, thereby producing an instantaneous expansion and volatilization of the injected liquid and vaporizing the fatty acids in the oil and withdrawing said vapor.

3. A process of refining oils containing fatty acids which comprises heating said oils to an elevated temperature and in a vacuum, injecting in said oils a liquid in the form of a fine mist suspended in a neutral carrier gas, said liquid being highly volatile at the temperature and pressure to which the oil has been heated, thereby producing an instantaneous expansion and volatilization of the injected liquid and vaporizing the fatty acids in the oil and withdrawing said vapor.

In testimony whereof I affix my signature.

ERNST WECKER.